United States Patent [19]

Owen

[11] 4,228,391
[45] Oct. 14, 1980

[54] INDUCTION MACHINE
[75] Inventor: Whitney H. Owen, Ogden, Utah
[73] Assignee: The United States of America as represented by the United States Department of Energy, Washington, D.C.
[21] Appl. No.: 896,539
[22] Filed: Apr. 14, 1978
[51] Int. Cl.³ .............................................. H02P 9/46
[52] U.S. Cl. ..................................... 322/35; 322/47; 310/112
[58] Field of Search ........................ 310/112, 114, 126; 322/35, 47; 318/437, 832; 290/44

[56] References Cited
U.S. PATENT DOCUMENTS

| | | | |
|---|---|---|---|
| 2,831,156 | 4/1958 | Mathews, Jr. et al. | 322/47 X |
| 3,226,582 | 12/1965 | Beckwith | 310/112 X |
| 3,280,400 | 10/1966 | Roe | 310/112 X |
| 4,112,311 | 9/1978 | Theyse | 322/35 X |

*Primary Examiner*—Robert J. Hickey
*Attorney, Agent, or Firm*—Richard G. Besha; Richard E. Constant; Ignacio Resendez

[57] ABSTRACT

A polyphase rotary induction machine for use as a motor or generator utilizing a single rotor assembly having two series connected sets of rotor windings, a first stator winding disposed around the first rotor winding and means for controlling the current induced in one set of the rotor windings compared to the current induced in the other set of the rotor windings. The rotor windings may be wound rotor windings or squirrel cage windings.

7 Claims, 5 Drawing Figures

INDUCTION MACHINE

BACKGROUND OF INVENTION

Induction machines, both motors and generators, are well known and widely used in electrical power systems for many applications. As is well known, a standard induction machine utilizes the commonly referred to transformer-like action to produce electricity or mechanical power from currents induced in the rotor windings from rotating fields produced by the stator windings. To obtain any useful work, the rotor must turn slightly slower or slightly faster than the stator's rotating magnetic field. If the rotor increases or decreases in speed, the rotor current will increase. If the rotor should stop entirely, large short circuit currents will be produced unless external resistance or reactance is incorporated into the rotor winding circuits. Thus, induction machines have been categorized generally as having limited speed ranges for practical application and as having very large rotor currents outside of the limited speed range. Rather elaborate speed control schemes using wave shaping or chopping have been utilized to overcome these limitations in operation but generally result in overheating of motor windings or creation of radio frequency noise and poor electrical load characteristics. Oftentimes these starting systems tended to reduce the efficiency of the motor design and construction.

It would be desirable to have an induction machine which retains a sine wave operation throughout a full range of speed control without creating overheating in the rotor windings or other deleterious effects thereto. Preferably such a machine would operate with practical rotor currents at low speeds, and, in motor operations, still produce sufficient torque to drive the machine.

One application receiving widespread attention at this time which would find these characteristics particularly attractive is in the operation of wind turbines to produce or generate electricity. Since the wind turbine speed is normally dependent upon wind velocity, fairly elaborate mechanical schemes have been proposed or developed to adjust the wind turbine chracteristics to reduce the turbine speed fluctuations with wind velocity changes or to modify the drive systems rotational speed to a relatively constant level regardless of turbine velocity. These arrangements are both expensive and often mechanically inefficient. In other wind turbine arrangements, the turbine is used to drive a direct current generator and then electrical means are utilized to convert the direct current energy to an alternating current. These latter schemes require rather costly and oftentimes inefficient electrical systems or produce deleterious harmonics in the power output which is either unusable by conventional alternating current systems or must be filtered from the power lines. It would be desirable to provide an alternating current machine which could generate 60 cycle sinusoidal electrical power directly onto the line power system without further conversion and regardless of turbine speed, above some minimum turbine velocity.

In addition, there are some wind rotor or turbine systems in which it would be desirable that the wind turbine be broght up to an operating speed by use of the same machine which is used to generate the electrical power, such as in those wind turbines which are not self-starting. Such an induction machine could then drive the wind turbine to an operating speed when the wind energy reached a level which sould support turbine action and then automatically be converted to a generator so long as the wind energy remained above the same desired threshold determined by the wind turbine characteristics and the generating system. As the wind velocity varied, and consequently the rotational speed of the wind turbine, such an induction machine could then continue to provide 60 cycle sine wave electrical energy to a power grid.

SUMMARY OF INVENTION

In view of the above, it is an object of this invention to provide a novel polyphase rotary induction machine.

It is a further object of this invention to provide a polyphase rotary induction machine which may operate at low speeds without necessarily introducing impedance into the machine circuits externally.

It is a further object of this invention to provide a polyphase rotary induction machine which is capable of generating sine wave electrical energy over a wide range of speeds in which the characteristics of the machine may be varied during operation by controlling the current induced in the rotor windings.

It will be understood that various changes in the details, materials and arrangements of parts, which are herein described and illustrated in order to explain the nature of the invention, may be introduced by those skilled in the art within the principal scope of the invention as expressed in the appended claims.

The invention comprises a polyphase rotary induction machine having a single rotor assembly, a first set of rotor windings fixed to the rotor assembly, a second set of rotor windings fixed to the rotor assembly at a location spaced from the first rotor windings; means for connecting conductors of the first rotor windings in series with conductors of the second rotor windings; first stator windings disposed around said first rotor windings, second stator windings disposed around the second rotor windings; and means for controlling the current induced in one set of the rotor windings compared to the current induced in the other set of rotor windings. A unique condition will exist when the two rotor winding sets have equal but opposing voltages induced. This may be visualized as two equal, but opposite currents which cancel and produce a net current of zero amperes.

DESCRIPTION OF DRAWING

The invention is illustrated in the accompanying drawing wherein.

DETAILED DESCRIPTION

Figure 1:
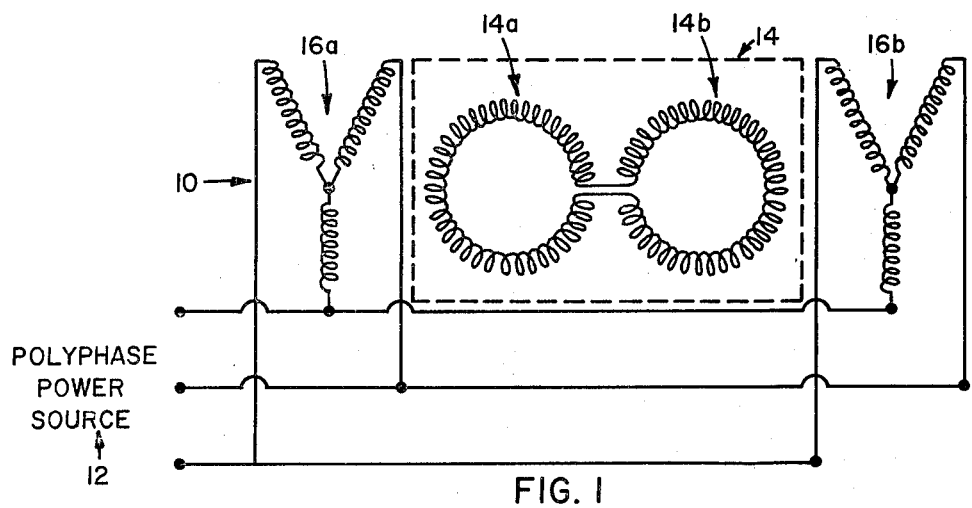
FIG. 1 is a schematic representation of the induction machine of this invention.

For purposes of describing the present invention, the induction machine 10 illustrated in FIG. 1 will be described in terms of a motor with the understanding that the same induction machine 10 may function as a generator without any modification to the machine itself. For example, when the induction machine 10 is energized by an appropriate power source 12, machine 10 will function as a motor. Conversely, should induction machine 10 be driven by an appropriate rotary drive system to a speed in excess of the motoring speed of machine 10, the machine will generate electricity and feed the same into the power source 12.

Induction machine 10 comprises in its simplest form a rotor 14 having separate rotor windings 14a and 14b in electrical series with each other and a first stator winding 16a disposed around rotor winding 14a and a second stator winding 16b disposed around rotor winding 14b. For purpose of illustration, the induction machine 10 is shown in a three phase configuration whereas it may be formed in any polyphase arrangement and connected to an appropriate polyphase power source, depending upon the desired output characteristics of the induction machine. The rotor windings 14a and 14b on rotor 14 are shown schematically and may be formed as squirrel cage windings or as wire wound windings. Rotor 14 may be a unitary member having the windings 14a and 14b wound thereupon or may be two distant rotors on a common shaft having appropriate electrical interconnections between the two rotor windings, such as by slip rings or the like. For simplicity, the preferred arrangement may be to form a single rotor having a single elongated squirrel cage winding which is long enough to accommodate and be encircled by the respective stator windings 16a and 16b. In this latter arrangement, the magnetic circuits produced by the stator windings 16a and 16b will effectively divide the single squirrel cage winding into the separate windings 14a and 14b with the squirrel cage bars acting as the series connections therebetween. The object of the divided rotor windings is to enable opposing voltages to be developed. With the arrangement thus far described, the induction machine 10 will function as a three phase motor having operating characteristics similar to a motor having a single stator winding 16a and rotor winding 14a with twice the horsepower, provided the stators are connected so as to produce series-aiding curvents in the rotor assembly.

Figure 2:
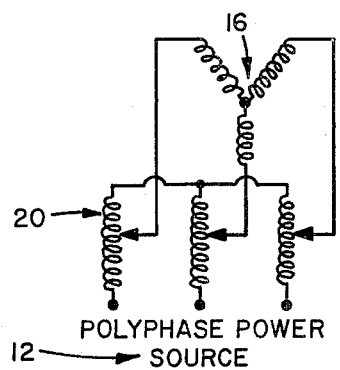
FIG. 2 is a schematic representation of a circuit arrangement for control of the induction machine of FIG. 1.

It has been found that the induction machine 10 of FIG. 1 may have its operating characteristics improved in the manner desired by this invention by controlling the voltage induced in one of the rotor windings 14a or 14b with respect to the other rotor winding so as to provide an unbalanced flow of opposing currents induced in the windings. One such form of unbalance can be produced by reducing the voltage supplied to one of the stator windings 16a or 16b, such as by connecting a polyphase voltage controller 20 between the power source 12 and a stator winding, such as stator winding 16 shown in FIG. 2. The magnitude of net rotor current is limited by controlling voltage reduction in the stator winding by controller 20. In a motor startup condition, the rotor will commence turning with a large torque because maximum or rated rotor current can be allowed to flow without excessively burdening the polyphase power source 12. When the rotor speeds up and generates a back emf, the stator voltage originally reduced can be further reduced, ultimately to zero. If the polarity of that stator is then reversed and the voltage then increased, the rotor current can be held at a rated value as the rotor continues to speed up. Operation in the final stage will be essentially like a normal motor utilizing only one stator having the combined effect of the two stator windings 16a and 16b. This arrangement thus provides a high torque during startup of the induction machine while eliminating the loss of electrical power that occurs in a conventional induction motor having resistances disposed in the rotor winding circuits to limit current. The voltage controller for the stator would only have to handle one-half of the induction machine's line current.

Figure 3:
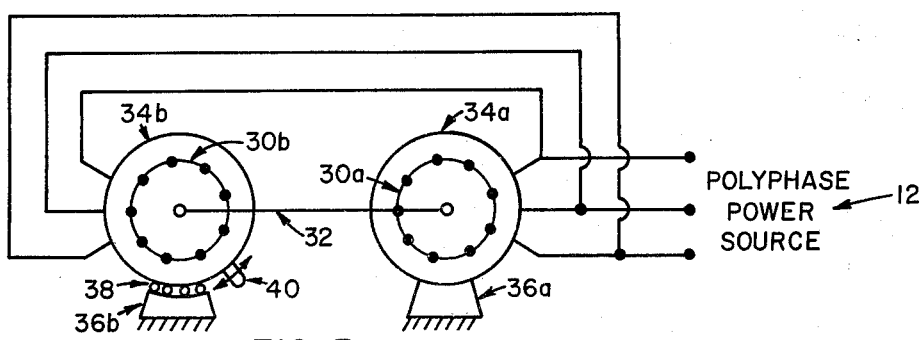
FIG. 3 is a diagrammatic representation of another arrangement to control the induction machine of FIG. 1.

FIG. 3 illustrates another arrangement to achieve the desired unbalance of induced rotor currents in the induction machine of this invention. In this arrangement the respective squirrel cage rotors 30a and 30b are electrically and mechanically interconnected in an appropriate manner as described above along a common rotor shaft 32 while one of the stator windings 34a is held in a fixed position by an appropriate mount 36a. The other stator winding 34b is rotatably supported by a suitable rotary bearing mechanism 38 on a fixed motor mount 36b. The rotatable stator winding 34b may be rotated about its axis by an appropriate means such as the lever 40 in the direction of the arrows shown using the bearing 38 as a rotary support. The stator 34b may thus be rotated physically to provide a phase shift between the rotating magnetic field generated by stator 34a in comparison to the magnetic field generated by fixed stator 34b. The mechanism 40 and rotary bearing 38 are preferably selected so as to provide a phase shift of from about 0° to 180° electrically with respect to each rotary magnetic field, the amount of mechanical rotation needed being dependent upon the number of phases of the power source and stator windings. Other mechanical rotation mechanisms may be utilized than the one illustrated by rotary bearing 38 and the lever 40, such as by use of a worm and a ring gear arrangement, a servomechanism, or the like which are either hand or remotely and/or automatically actuated. For example, the remote or automatic system may include appropriate servomotors together with suitable sensors for monitoring the operating characteristics of the induction machine so as to provide automatic adjustment of the phase angle between the stator magnetic fields during different operating conditions and load factors of the induction machine.

By way of example, if it is assumed that the induction machine illustrated in FIG. 3 comprising the combined rotor windings 30a and 30b and stator windings 34a and 34b are separately two 10-horsepower induction motors coupled together and that the common rotor assembly is a lengthened squirrel cage rotor with one-half inserted in one stator winding and the other half inserted in the other stator winding, the following operating sequence will result. It is assumed initially that the shaft of the rotor is uncoupled from any external load or prime mover, that the stators are mechanically phased so as to be in direct opposition (with pole structures in-line axially) and that the electrical connections to each stator winding results in opposite field rotation with respect to the rotor shaft. With these conditions, the machine will produce no external torque on the shaft when the polyphase power source is connected to the stators. In other words, the torque of one 10 horsepower unit is at a position level A and the torque of the other 10 horsepower unit is at a negative level B and of equal magnitude. Such torques will be only that generated by loss effects in the rotor because rotor current in the conductors will be zero due to induced voltage opposition.

If the electrical connections to one of the stators are changed to produce reversed phase rotation from that of the initial conditions, the rotor current will rise to a maximum value of the same magnitude that would occur in a 20 horsepower motor of the same basic design used in each 10 horsepower section of the induction machine. Starting torque, accelerating torque and running torque will be that of a 20 horsepower machine to a close approximation. In-rush current will also follow that experienced by a single 20 horsepower motor.

If one stator is electrically disconnected from the power source, the other stator will see the electrical equivalent of a wound-rotor instead of a squirrel cage. The in-rush current from starting conditions will be less because the rotor would have twice the resistance for the same induced voltage. The single stator will accelerate the rotor to a speed where the rotor reactance equals the higher resistance. The slip of the rotor would be about twice the value as one running as a 20 horsepower machine and the breakdown torque would be that for a 10 horsepower machine.

It can thus be seen that a relatively soft start can be achieved with this induction machine by simply connecting one stator at a time to the supply line. The second stator would be connected in series aiding when the first stator nears the breakdown torque region in accelerating the rotor until 10 horsepower capability is reached. By using continuous phase shifting action, the torque output of the shaft can be controlled to desired values between 0 and the value produced as a 20 horsepower squirrel cage induction machine. Under initial conditions of direct opposition, both electrical and mechanical, the torque output is 0. If an adjustable stator is displaced from the fixed stator by rotation in the same direction that the magnetic field of the fixed stator is moving, then the fixed stator will produce a net positive torque on the rotor and some of the adjustable stator torque will become positive rather than negative. As the position of 180° electrical phase shift is approached, both stators will become positive (aiding) at full magnitude. For some applications, a suitable starting condition would be at a position phase angle between stators greater than 0°, and then moved toward 180° for normal operation. A final position angle less than 180° can be used to achieve an intermediate speed analogous to the manner of a standard wound rotor motor coupled to external resistance through slip rings. The adjustable stator can be visualized as a voltage regulator to adjust current in the rotor. Excess current is avoided by the bucking action of voltage generated in the rotor by the adjustable stator. Therefore, an intermediate speed can be maintained continuously at high efficiency.

Basic induction motor torque is given by the expression $$T = K \phi E R / R^2 + X^2$$

Where E, R, and X are values of rotor induced voltage, resistance and inductive reactance, respectively. These vary with rotor speed, with E and X having the greatest change. Physical constants for a given machine are expressed by K. The stator flux, $\phi$, is constant where supply voltage is held constant.

Rotor current is a function of E, R, and X and reaches maximum value where R and X become equal. At that value of current the machine produces maximum torque, called Breakdown Torque. For a wound rotor motor, R is made equal to X at standstill, where E and X are maximum. The motor can develop full torque at zero speed.

Torque for the machine described is given by the expression $$T = Ta + Tb = K\phi \left[ \frac{Ea\ Ra}{Ra^2 + Xa^2} + \frac{Eb\ Rb}{Rb^2 + Xb^2} \right]$$

Under balanced conditions $Eb = -Ea$ and the expression goes to zero. When the adjustable stator is displaced in angular position with respect to the fixed stator, and the rotor commences to turn in the direction of the fixed stator field, Ea and Xa will decrease while Eb and Xb will increase. However, a component of Eb begins to develop that is in-phase with Ea. As the position angle is increased between stators, Eb approaches Ea and they become equal at 180°.

The rotor resistance is Ra+Rb, but each is partially affected by the rotor current frequency as the position displacement angle changes.

The net effect is an improvement in rotor power factor as the Xa influence decreases more rapidly than the Xb influence increases. This can be visualized by recognizing the dual nature of Eb in regard to having a component in-phase with Ea.

Torque production in the motor mode is actually the vectorial sum of the torques produced by each half. The resultant of two vectors can be derived by using the Cosine Law. For the present induction machine this would be $$T^2 = Ta^2 + Tb^2 + 2\ Ta \cdot Tb \cos \alpha$$

At the half-way point, where the adjustable stator has been shifted 90° with respect to the fixed stator, the cosine term goes to zero. The equation then becomes $$T = 1.414\ Ta,$$

because Ta is equal to Tb in absolute magnitude.

The statement that $Rc = Ra + Rb$ should also be recognized as having a complex nature because of the change in frequency in the rotor circuit as the position angle between stators is increased. At 90° Ra=Rb in the physical sense. At 180°, where the rotor becomes essentially a single element, Rc=2 Ra, but E also becomes effectively twice the value of Ea. Thus, the coefficient, 2. for the entire expression represents the sum of Ta+Tb.

Comparison of performance between a regular induction machine and the present machine in regard to torque vs. speed will be complex. The design features of a squirrel cage and a wound rotor are combined. Current limiting in the present machine results in lower power transfer, therefore it cannot change speed as rapidly as a squirrel cage motor. Consequently, a lower torque situation exists under conditions of lower speed. This is advantageous where the mechanical load also requires a lower torque. In other words, acceleration to higher speed is not always desired. The regular induction machine attempts to run near synchronous speed, and draws a large current until it gets there.

The torque equation for this induction machine may be simplified by including the position angle, $\alpha$, between positions of the fixed stator and the adjustable stator.

$$T = 2K\phi \left[ \frac{E\,Rc}{Rc^2 + X^2} \right] \sin \frac{\alpha}{2}$$

Where α=0° at balanced conditions, and 180° at full series aiding conditions.
Rc=Ra+Rb, and E and X are essentially the values produced by one stator acting alone. This induction machine will produce breakdown torque greater than a conventional squirrel cage machine at slow speed, except when the angle α is very small.

It is noted that if α=180° at balance, and 0° at full series aiding, then Sin α/2 may be replaced with Cos α/2 and that the simplified equation produces the same result as the proceeding torque equation at the half-way point, since 2 Sin α/2=1.414 (where α=90°).

Figure 4:
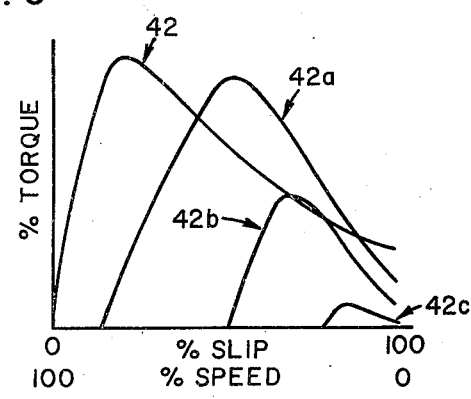
FIG. 4 is a graph showing operating curves for a squirrel cage induction motor incorporating the features of this invention compared to a regular squirrel cage induction motor.

The curves in the FIG. 4 illustrate the relative shapes of the torque-speed curves.

Where this induction machine shaft is driven by a prime mover, it will shift from motor action to generator action as the frequency of Eb increases and the frequency of Ea decreases when the shaft speed is raised above the motoring speed. The voltage Eb rises and Ea falls to a greater degree than in the motor mode, so that current flow in the rotor reverses direction. If speed is increased to what would be called synchronous speed for a regular induction motor, Ea would go to zero, then reverse polarity and increase again for rotor speed above the synchronous value. The rotor current would become extremely large because Ea and Eb would have the same basic polarity. Electrical output would also be large, consequently only an oversize prime mover could drive the induction machine to such high speed. Speed less than synchronous would be the normal range.

The adjustable stator may be visualized again as a voltage regulator to govern the flow of rotor current. For the motor mode, the adjustable stator is shifted away from full opposition so that a net current can flow in the rotor. For the generator mode, it is only necessary for the shaft to moderately speed up to enable the adjustable stator to cause a reverse current to flow in the rotor.

The position angle will determine the speed magnitude necessary to obtain generating action. When α is zero, a small rotor current will start flowing in the generating mode as soon as the rotor starts turning, in either direction, because the voltage in the rotor from one stator will override the other.

As soon as angle α is increased, the motor mode becomes operative, hence a higher shaft speed is required to cause reversal of rotor current. When angle α is increased to 180°, then shaft speed will have to increase above synchronous speed to obtain generator action (e.g. the 20 hp motor commences to generate above synchronous speed). The adjustable stator varies from a regulating action to a work action during operation of the induction machine as the position angle α increases. Thus, the adjustable stator provides a dual function as a regulator and as torque producer in combination with the rotor winding or portion of rotor winding disposed therein.

This operation is illustrated in FIG. 4 where curve 42 illustrates the operation of an induction motor having a standard squirrel cage rotor and also an induction machine having an extended squirrel cage rotor with two stators windings at an electrical position angle of 180° with respect to each other. Curves 42a, 42b and 42c illustrate the induction machine operating characteristics as the electrical position angle is changed from 180° towards zero, respectively. These curves take into consideration that current flow will be reduced in the present induction machine below that of a comparable squirrel cage until the position angle reaches 180°. It is noted that the extension of these operating characteristic curves below the horizontal axis represents a generating mode of operation rather than a motor mode.

Figure 5:
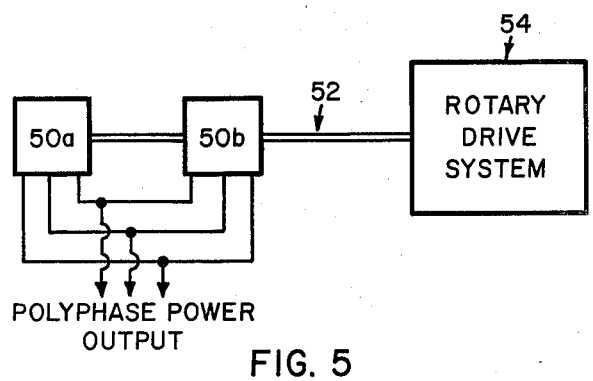
FIG. 5 is a diagrammatic representation of the induction machine of FIG. 1 being used as a generator.

FIG. 5 illustrates an induction machine having commonly connected first and second stator and rotor portions 50a and 50b similar to that illustrated in FIG. 1 connected by shaft 52 to a suitable rotary drive system 54 so as to generate electrical power fed to a suitable polyphase power system.

The rotary drive system 54 may be any suitable mechanical power source such as an internal combustion engine, a hydroelectric turbine, a wind turbine or the like. It has been found that an induction machine generator incorporating the features described above is particularly suitable for generating electricity into a polyphase sinusoidal electrical power system or grid at a constant frequency even though the rotary speed may vary, such as in the case particularly of a wind turbine. A wind turbine will inherently, without some mechanical adaptations, rotate at a speed that is proportional to the wind velocity. If the generating system attached to the wind turbine does not produce a constant frequency output into the power grid, then some adjustment must be made either to control the wind turbine speed or to convert the varying frequency electrical energy into a constant frequency electrical energy.

When the induction machine rotor is turned by the drive system 54 using an induction machine including two portions 50a and 50b in an initial condition with stator position angle at zero, an electrical unbalance occurs in the rotor due to the induced voltage from one stator increasing while that from the other stator is decreasing. A low frequency residual current will be produced in the rotor conductors which will initially be small in magnitude but will increase as the rotor speed increases. This rotor current will flow in a reverse direction from that which will flow if the rotor were to be in a conventional stator running slightly below synchronous speed as a motor. The optimum generator speed will be where an effective rated current flows in the rotor conductors. Using the mechanical phase shifting technique described in FIG. 3, the fully coupled speed can be adjusted to whatever is desirable for drive system 54.

The described induction machine may be particularly useful in a wind turbine driven system where the wind turbines are distributed along a power grid wherever there is wind energy available and comparable electrical power needs, such as at remote locations in rural areas. Since the wind energy is generally never constant or often not above some useful threshold, wind turbines may need to be driven to some initial rotary speed in a given wind energy environment in order that the wind energy may then drive the wind turbine, particularly in the case of vertical rotor wind turbines. Vertical rotor wind turbines require an initial rotary motion with respect to the wind energy at some threshold after which the turbine will accelerate to a higher speed dependent upon the wind velocity. The induction machine of this invention may be connected to a power grid and automatically adjusted to a motor type of action when the wind energy increases above the threshold so as to drive the wind turbine above the threshold speed. When the turbine reaches this speed and accelerates from the wind energy to its operating speed, an automatic sensor may adjust the stator position angle or the stator voltage to convert the induction machine to a generator and continue to appropriately vary the position angle or stator voltage to maintain an effective output into the power grid, regardless of the wind velocity variations.

The power variations of the wind turbine can be effectively utilized by adjustment of the induction machine stator position angle, or the stator voltage, so that torque and speed of the mechanical and electrical elements will match. The induction machine full load design must be compatible with the prime mover full load design. The induction machine can then follow the prime mover power output down to some minimum effective value.

In all of the above discussion the magnetic circuit excitation requirements are assumed to be provided by locally connected capacitors on the supply line. This is analogous to the local exciter of a synchronous alternator.

Since a squirrel cage rotor in a single phase motor is essentially identical to that of a polyphase motor, there is special consideration for single-phase operation of the induction machine using the rotor described in this invention. Any polyphase induction machine can operate on a single phase power source, after the rotor is placed in motion, at a reduced power rating. A single phase motor is necessarily a polyphase machine (usually two phase) under starting conditions, with the additional winding switched of after the rotor speeds up. There is no advantage with a single phase motor where polyphase power is available, especially in sizes above one horsepower. The reason for widespread use of standard single phase motors is for economic savings in numerous small size applications.

As an induction generator a polyphase stator is not inherently necessary, because the rotor is placed in motion by the prime mover. Thus, two single phase stators arranged with the extended squirrel cage rotor described in this invention will readily function as an induction generating machine. Angular adjustment of one stator with respect to the other will enable loading of the machine in the same manner as with polyphase stators, except at a lower efficiency comparable with polyphase vs. single phase motors.

For motor operation there is no general case where single phase stators would be useful because an effective rotating magnetic field would not be present to start the rotor. However, the machine could have particular usage in applications where prime moving elements are present.

Such a particular case would be in wind turbine applications where a starting winding would give the necessary rotating field to drive the wind turbine rotor to its self-accelerating speed. The induction machine would be polyphase in the true sense of the word, but the polyphase excitation would be derived from a single phase source by use of phase-shifting capacitors. With the starting winding switched off when the wind turbine accelerates, the machine would then operate with the stators in a single-phase mode.

What is claimed is:

1. A rotary induction machine electric power generating system comprising a single rotor assembly, a first set of rotor windings fixed to said rotor assembly, a second set of rotor windings fixed to said rotor assembly at a location spaced from said first rotor windings, means for connecting each winding of said first rotor windings in series with a winding of said second rotor windings, a first stator winding disposed around said first rotor windings, a second stator winding disposed around said second rotor windings, means associated with one of said stator windings for controlling the current induced in one set of said rotor windings with respect to the current induced in the other set of rotor windings, means for connecting an alternating current source to said first and second statur windings, and wind turbine means for rotatably driving said rotor assembly, said single rotor assembly together with said rotor and stator windings providing unitary means for initiating rotation of said wind turbine means and for generating electrical power with a frequency equal to that of said alternating current source irrespective of the speed of rotation of said single rotor assembly.

2. The induction machine of claim 1 wherein said rotor and stator windings are polyphase windings.

3. The induction machine of claim 1 wherein said controlling means includes means for adjusting the voltage supplied to one of said stator windings.

4. The induction machine of claim 1 wherein said controlling means includes means for rotating one of said stator windings with respect to the other of said stator windings.

5. The induction machine of claim 4 wherein said stator rotating means mechanically rotates one of said stator windings on its axis.

6. The induction machine of claim 4 wherein said stator windings are rotated from about 0 to about 180° electrically with respect to each other.

7. The induction machine of claim 1 wherein said first and second rotor windings are squirrel-cage rotor windings.

* * * * *